May 4, 1965 D. A. WORDEN ETAL 3,181,560
PRESSURE REGULATING VALVE CONSTRUCTION
Filed Aug. 29, 1960 2 Sheets-Sheet 1

INVENTORS.
Sam Robert Sinden
Donald A. Worden
Emery Whittemore
By Sommer & Graham
ATTORNEYS May 4, 1965   D. A. WORDEN ETAL   3,181,560
PRESSURE REGULATING VALVE CONSTRUCTION
Filed Aug. 29, 1960   2 Sheets-Sheet 2
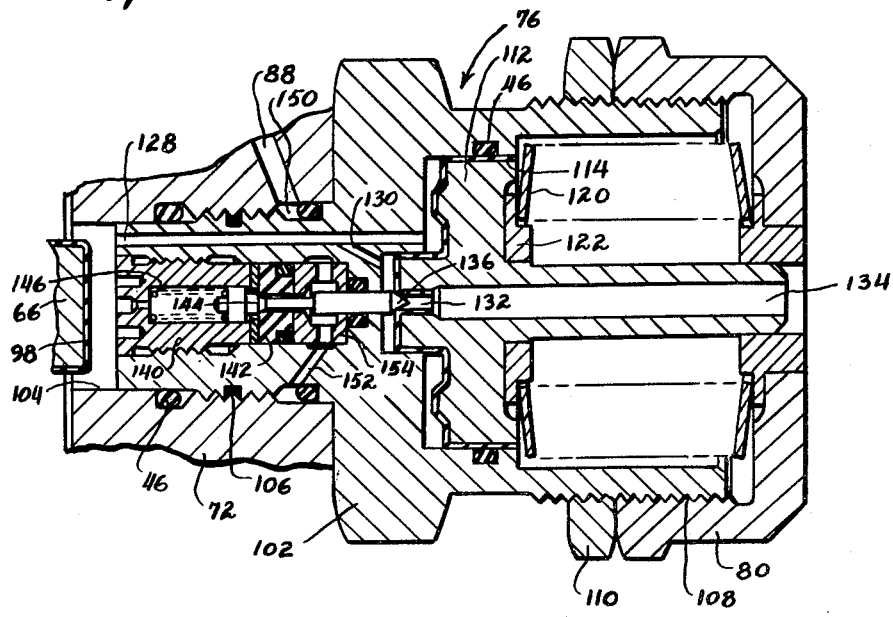
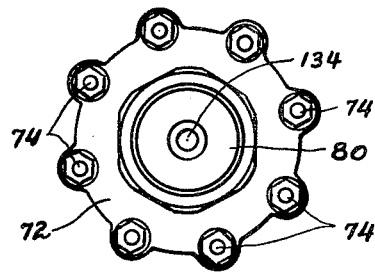
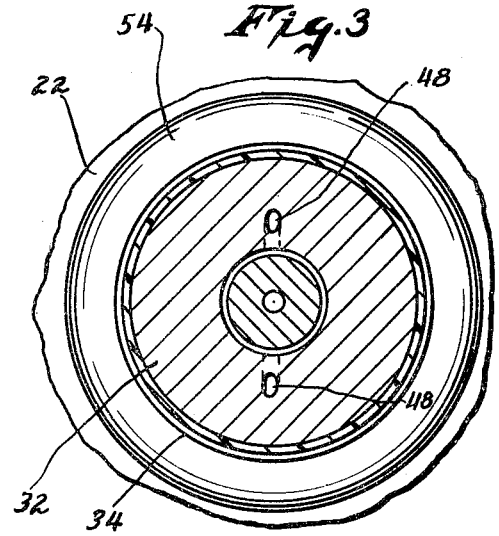
INVENTORS.
Donald A. Worden
BY Emery, Whittemore,
Sandoe & Graham
ATTORNEYS

United States Patent Office 3,181,560
Patented May 4, 1965

3,181,560
PRESSURE REGULATING VALVE
CONSTRUCTION
Donald A. Worden, Pompton Plains, and Sam Robert
Smolen, Bloomingdale, N.J., assignors to Marotta
Valve Corporation, Boonton, N.J., a corporation of
New Jersey
Filed Aug. 29, 1960, Ser. No. 52,529
5 Claims. (Cl. 137—494)

This invention relates to valves. Although intended primarily for pressure relief valves, and for valves that have sensing pressure chambers, some sub-combinations of the invention are applicable to valves generally.

It is an object of the invention to provide an improved pressure relief valve with pilot valve control, and with reference pressure means that are used as an operating motor for the valve.

Another object of the invention is to provide a valve assembly having plastic coated parts for improving the operating characteristics of the valve and for obtaining the advantages of plastic parts without the dimensional variations that result from moisture absorption and temperature changes of solid plastic parts. This is particularly important in relief valves and in pressure regulators where the reductions in pressure cause drop in temperature, sweating of the parts, and moisture absorption.

The plastic coated parts of this invention are used against metal valve seats, or other hard seats, and they obtain sealing at lower pressures than hard valve elements and seats, but without the limited mechanical strength of plastic seats.

Other objects, features and advantages of the invention will appear or be pointed out as the description proceeds.

In the drawing, forming a part hereof, in which like reference characters indicate corresponding parts in all the views:

FIGURE 2 is an enlarged, fragmentary detail view, in section, showing the pilot regulator of the apparatus shown in FIGURE 1;

FIGURE 3 is an enlarged sectional view taken on the line 3—3 of FIGURE 1; and

FIGURE 4 is an end view, on a reduced scale, of the pressure relief valve shown in FIGURE 1.

Figure 1:
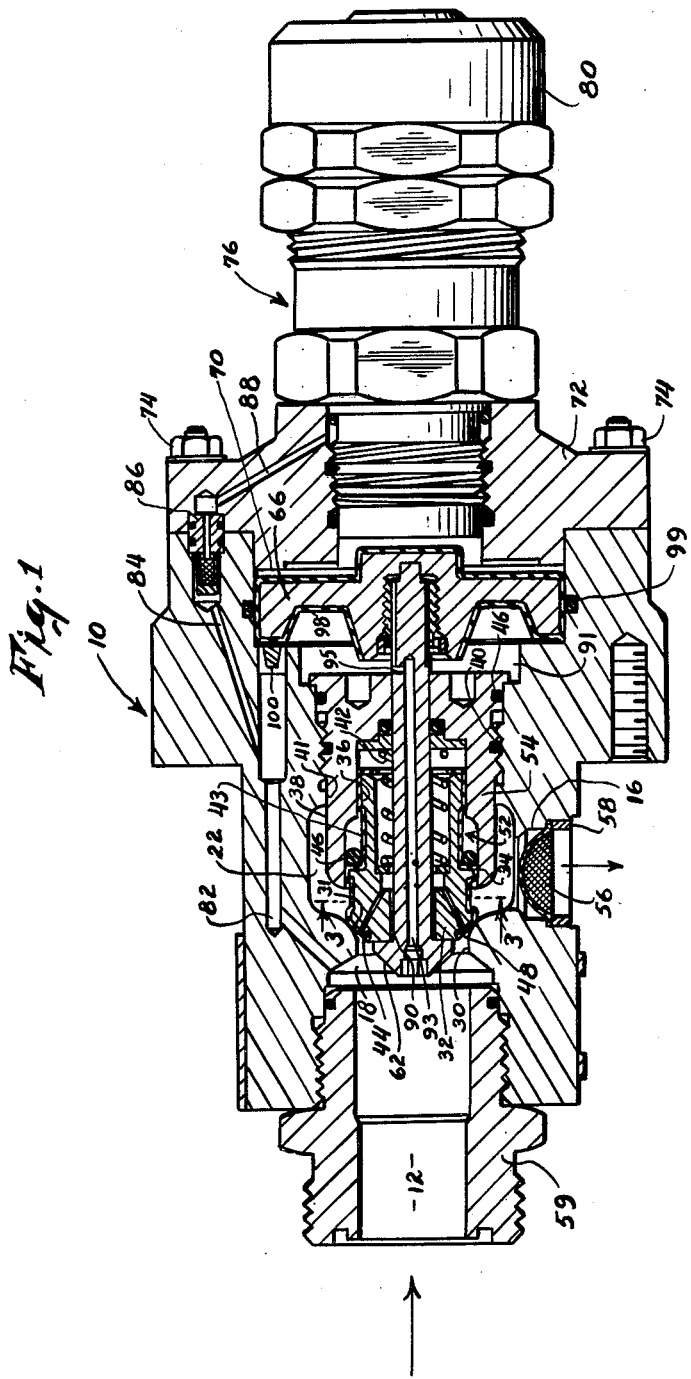
FIGURE 1 is a fragmentary sectional view showing a pressure relief valve made in accordance with this invention.

FIGURE 1 shows a pressure relief valve having a housing 10 with two fluid passages opening through the wall of the housing. These passages include an inlet passage 12, and a vent passage 16. Within the housing 10, there is a chamber 22 with which the passage 16 communicates.

The inlet passage 12 and the chamber 22 are separated by a partition 30 having an opening through it surrounded by a tapered valve seat 31. There is a valve element 32 in the chamber 22 with a tapered face that seats against the tapered seat 31. This valve element 32 slides in guides 34 and 36 in a fitting 38 which screws into a bore 40 in the housing 10. The fitting 38 is held in a centered position with respect to the valve seat 26, by an unthreaded portion 41 of the bore 40 which contacts with a cylindrical portion of the fitting 38 ahead of the threads.

A helical spring 42 compressed between the end of the fitting 38 and a back surface of the valve element 32 urges the valve element 32 into closed position in which it contacts with the tapered seat 31.

The valve element 32 is made of hard material, and preferably metal, and it is coated with a soft material, preferably a thermoplastic 43, such as nylon. This plastic material has a degree of resilience and it fits the valve element 32 like a glove. Nylon material is preferably under tension so as to obtain a tight fit.

In order to have metal-to-metal contact between the valve element 32 and its actuator, the plastic material 43 does not extend all the way across the end face of the valve element 32. There is an annular groove in the valve element 32 and a bead 44 at the end of the plastic material 43 fits into the groove and anchors the plastic material to the valve element 32.

The circumferential side wall of the valve element 32 is of different diameters at different regions along its axial length, and at some places its diameter is less than the diameter near the front face of the valve element so as to give the plastic coating 43 a tighter grip on the valve element.

Although plastic valves and valve seats have important advantages in obtaining tight sealing at lower pressure than are required for metal-to-metal contacts, large volumes of plastics, such as are encountered with solid plastic valves, have been unsatisfactory in precision valves because of variations in the size of the plastic valves with changes in moisture and heat. A nylon valve will grow as much as 7% as the result of moisture absorption. With this invention, however, the plastic is a coating on the metal valve and this keeps the volume of plastic within reasonable limits so that any changes in dimensions are very small and not sufficient to adversely affect the operation.

In order to obtain good adherence of the plastic coating on the metal valve element, a fluidized process is used to apply the plastic. The valve element is placed in powdered plastic and the powder tends to enter any crevices in the surface of the metal part. The valve element is hot when inserted in the powder and the heat melts the powder which contacts with the surface of the valve element because the plastic used is of the thermoplastic type.

By controlling the heat and the length of time that the valve element remains in the powdered plastic, a coating of the desired thickness can be built up on the metal surface of the valve element, and after cooling, this coating is machined to accurate dimensions. The cooling causes the plastic material to shrink so that it provides a prestressed coating which fits the valve element like a tight glove.

The plastic coating on the metal valve element of this invention is particularly advantageous for a relief valve or in a pressure regulator, because the pressure drop in such apparatus causes the gas to cool and this cooling is often below the dew point so that there is sweating of the valve element. Accumulation of such moisture on a solid plastic valve will cause change in dimensions of the valve with resulting change in the diameter of the portion of the valve behind the passage which the valve seals. This interferes with the compensation of the valve since an increase in diameter beyond the valve seat tends to interfere with the relative areas which result in the desired counterbalancing. Changes in dimensions also influence the clearance of the valve element in the guides in which it moves.

The valve element 32 has passages 48 for supplying pressure to the space behind it so that it is substantially counterbalanced as to the pressure in the inlet passage 12.

The vent passage 16 which leads from the chamber 22, is provided with a screen 56 held in place by a ring 58. The preferred construction has a plurality of vent passages 16 angularly-spaced around the housing. If the invention is used as an ordinary shut-off valve for controlling passage of fluid between different conduits, the passage 16 is connected with another conduit by fittings such as the inlet fitting 59 which is screwed into the threaded portions of the inlet passage 12.

The valve element 32 is moved into open position, against the force of the spring 42 by an actuator 62 which extends through an opening in the front faces of the valve element 32 and which connects at one end with a piston 66 that forms the left hand wall of a sensing pressure chamber 70. This chamber 70 has another wall formed by a cylindrical counter-bore in the main body of the housing 10 and the chamber is closed at its right-hand end by a portion 72 of the housing.

There are bolts 74 located in a ring around the housing portion 72 and securing the housing portion 72 to the main body of the housing 10. A pilot regulator 76 is screwed into an opening in the end of the housing portion 72. The construction and operation of this pilot regulator 76 will be described in connection with FIGURE 2. For the present it is sufficient to understand that the pilot regulator 76 has a knob 80 which can be adjusted to cause the pilot regulator to supply fluid under pressure to the sensing pressure chamber 70. The supply of fluid to the pilot regulator 76 comes through a passage 82 which communicates with the inlet passage 12, and through another passage 84 leading through a connector 86 to a final passage 88 located in the same end portion 72 as the pilot regulator.

The actuator 62 has a shoulder 90 in position to contact with the end face of the valve element 32 when the actuator 62 moves toward the right in FIGURE 1 to open the valve element 32.

The sensing pressure chamber 91 on the left-hand side of the piston 66 is in communication with the inlet passage 12 through a passage 93 which leads through the actuator 62. There is a restriction 95 at the end of the passage 93 where it opens into the space on the left-hand side of the piston 66. This restriction 95 makes the rate of flow of gas to the left-hand side of the piston 66 less than the rate of flow from the chamber 18 to the sensing pressure chamber 70 through the pilot control valve 76 so that when there is a change in inlet pressure, the change occurs more quickly in the sensing pressure chamber 70 than in the portion of the chamber 91 on the left-hand side of the piston 66.

The piston 66 is rigidly connected with the actuator 62 so as to move as a unit therewith. The piston 66 is covered with a coating of thermoplastic material 98, preferably nylon. This coating greatly reduces the friction of the piston 66 against the wall of the sensing pressure chamber 70 and because of the fact that the rest of the piston 66 is made of metal, there is very little change in the dimensions of the piston with changes in temperature and moisture, and there is, therefore, substantially no change in the clearance of the piston 66 in the cylindrical sensing pressure chamber 70. The clearance is sealed by an O-ring 99 located in a circumferential groove in the wall of the cylinder. The end of the passage 82 is closed by a plug 100 so that the only communication between the inlet passage 12 and the sensing pressure 70 is through the pilot valve 76.

FIGURE 2 shows the construction of the pilot regulator 76. This pilot regulator includes a housing 102 with a stem portion that screws into a bore 104 in the end portion 72 of the pressure relief valve housing. An O-ring 46 seals the clearance along the stem and a plastic insert 106 locks the threads against unscrewing. The knob 80 screws over threads 108 on the outside of the housing 102 and this knob 80 can be locked in any adjusted position by a lock nut 110.

A piston 112 is located in a cylindrical portion of the housing 102 and this piston 112 is covered with a plastic coating 114 similar to the plastic coatings on the other parts already described. There is a circumferential groove in the cylindrical wall of the housing 102 and this circumferential groove holds packing consisting of an O-ring 46 in contact with the plastic coating on the outside of the piston 112. The cylindrical surface of the piston 112 which contacts with the O-ring 46 is longer than the stroke of the piston 112 so that the O-ring 46 seals the clearance around the outside of the piston for all positions of the piston.

The piston 112 is urged toward the left in FIGURE 2 by a group of spring washers 120 compressed between the knob 80 and a washer 122 at the back of the piston 112. A helical spring or any other spring can be substituted for the washers 120, these washers merely being representative of means for exerting a force on the piston 112 and adjustable to determine the amount of this force by regulating the knob 80.

The other side of the piston 112 is exposed to the pressure in the sensing pressure chamber 70 through a passage 128 and a branch passage 130. There is a bleed passage 132 opening through the piston 112 and communicating with an exhaust outlet 134 in the stem of the piston 112. When the piston 112 is in the position shown in FIGURE 2, fluid is prevented from escaping through the bleed passage 132 by a needle valve 136; but whenever the pressure on the left-hand side of the piston 112 is sufficient to overcome the pressure of the spring washers 120, the piston 112 is moved toward the right in FIGURE 2 and away from the needle valve 136 so that the fluid can escape through the bleed passage 132 and through the exhaust outlet 134 to reduce the fluid pressure in the sensing pressure chamber 70. This occurs whenever the relief valve is adjusted, by turning the kob 80, to set it for a lower sensing pressure.

The pilot valve includes also a fitting 140 screwed into the left-hand end of the housing 102. Just beyond the fitting 140 there is an insert comprising a seat 142 having an axial passage for the flow of gas. A poppet valve 144 moves toward and from this seat 142 to open and close the gas passage through the seat. The valve 144 is urged toward closed position by a helical spring 146 compressed between a shoulder of the fitting 140 and a collar on the back of the valve 144. The collar on the valve 144 having a larger diameter than the inside diameter of the washer 145, provides a stop to prevent excess coining of the seat 142. The needle valve 136 is the end portion of a stem of the valve 144.

When the needle valve 136 is in closed position, and the piston 112 is moved toward the left in FIGURE 2, by the force of the spring washers 120, the valve 144 is moved into open position. This permits fluid under pressure to flow from the passage 88 into an annular clearance 150 and then through a passage 152 and into the interior of a spacer 154 from which the gas flows past the open valve 44 and through the end of the fitting 140 into the sensing pressure chamber 70.

As this pressure builds up, it reaches a value where it exerts sufficient force on the piston 112 to move the piston toward the right, against the force of spring washers 120, until the valve 144 is returned to closed position by the spring 146. This stops further build-up of pressure in the sensing pressure chamber 70 and the force of the gas against the left hand side of the piston 112 is balanced by the pressure of the spring washers 120 against the right hand side of the piston 112. This condition remains stable until the relief valve is to be adjusted for a different sensing pressure. To do this, the knob 80 is turned in a direction to relieve the pressure of the spring washers 120 with the result that the pressure in the sensing pressure chamber 70 becomes sufficient to move the piston 112 away from the needle valve 136 so that fluid can escape from the sensing pressure chamber through the bleed port 132 out through the exhaust outlet 134, as previously explained.

As pressure in the chamber 91 exceeds that in the chamber 70, the piston 66 moves to the right, moving the valve element 32. This allows gas to flow from the passage 12 into the passage 22 and out through the passages 16. When pressure is reduced in the chamber 91 slightly below the regulated pressure in the chamber 70, the piston 66 moves to the left, reseating the valve element 32. Further reduction of pressure in the chamber 91 causes the piston 66 to move to the extreme left. This increases the volume of the chamber 70, causing a drop in pressure. This, in turn, opens the valve 144, as previously explained. Due to the pressure in the passage 88, which equals the pressure in the chamber 91, being lower than the regulated setting, the valve 144 remains open and the pressure in the chamber 70 will equal the pressure in the chamber 91 at any point below the set regulation of the pilot valve 76.

It should be understood that a pilot valve other than that illustrated in FIGURE 2 can be substituted in this regulator, and some features of the invention are equally applicable to a construction in which a magnetic actuator or other means are used in place of a pilot regulator for varying the control pressure to the chamber 70.

The preferred embodiment of the invention has been illustrated and described, but changes and modifications can be made and some features can be used in different combinations without departing from the invention as defined in the claims.

What is claimed is:

1. A valve assembly including
   (a) a housing having two passages opening through a wall thereof,
   (b) chambers within the housing including an inlet chamber and an end chamber which communicate with one another through an opening surrounded by a valve seat,
   (c) a valve element that closes against said seat,
   (d) guides along which the valve element reciprocates toward and from the valve seat, into open and closed positions, respectively,
   (e) a pressure-responsive actuator operatively-connected with the valve element and having a surface area exposed to gas pressure from one of said chambers of the housing for moving the valve element toward one of said positions,
   (f) means urging the valve element to move in opposition to the pressure against said surface,
   (g) said actuator having an abutment thereon which contacts with the valve element to operate said valve element,
   (h) the valve element having a surface portion substantially parallel to the valve seat and which contacts therewith when the valve element is in closed position,
   (i) said surface portions having a thin layer of plastic material that absorbs some water when the valve element is subjected to sweating as the result of pressure drop in the valve assembly,
   (j) the valve element being made of harder and non-water-absorbent material beneath the layer of plastic whereby growing of the valve element is avoided and the valve-operating abutment remains in substantially constant relation to the surface area of the actuator exposed to the gas pressure.

2. The valve assembly described in claim 1 characterized by the pressure-responsive actuator being a movable wall of a chamber that communicates with a space exposed to the pressure from one of said chambers, and said surface area that is exposed to the gas pressure being on one side of said wall, and a plastic coating on said wall with material of the wall behind said coating which is non-absorbent of water.

3. The valve assembly described in claim 2 characterized by the movable wall being a piston, and the housing having a cylinder therein in which the piston reciprocates and a portion of which forms with the piston the chamber for gas pressure to operate the pressure-responsive actuator, the piston having plastic coating on its circumference which contacts with the cylinder as well as on its surface area subject to the gas pressure whereby both the reciprocating valve and piston have plastic coating on their surfaces that contact with surfaces of the housing.

4. The valve assembly described in claim 3 characterized by the plastic on the valve element and the piston being nylon.

5. The valve assembly described in claim 1 characterized by said means urging the valve element to move in opposition being a sensing pressure chamber and a pilot regulator which controls the pressure in the sensing pressure chamber in response to changes in the pressure to be controlled.

References Cited by the Examiner

UNITED STATES PATENTS

| | | | |
|---|---|---|---|
| 2,250,813 | 7/41 | Rea | 251—358 |
| 2,332,406 | 10/43 | Smith | 137—494 |
| 2,638,309 | 5/53 | Fortune | 251—358 |
| 2,720,887 | 10/55 | Safford | 137—116.5 |
| 2,730,326 | 1/56 | Stahen | 251—358 |
| 2,817,562 | 12/57 | Fleming et al. | 92—155 |
| 2,920,861 | 1/60 | Hartmann | 251—357 |
| 2,954,047 | 9/60 | Falteysek et al. | 137—494 |
| 2,973,183 | 2/61 | Alger | 251—368 X |
| 2,982,294 | 5/61 | Koutnik | 137—116.5 |
| 2,998,288 | 8/61 | Newhouse | 309—4 |
| 3,026,081 | 3/62 | Rossi | 251—62 X |
| 3,028,878 | 4/62 | Natho | 251—282 X |
| 3,032,061 | 5/62 | Silver | 137—116.5 X |
| 3,062,496 | 11/62 | Stehlin | 251—357 X |

MARTIN P. SCHWADRON, *Acting Primary Examiner.*